No. 742,484. PATENTED OCT. 27, 1903.
W. S. PEAVEY.
LUBRICATOR.
APPLICATION FILED MAR. 31, 1903.
NO MODEL.

Witnesses:

Inventor:
Wm. S. Peavey
by Everett & Hopkins
Attys

No. 742,484. Patented October 27, 1903.

UNITED STATES PATENT OFFICE.

WILLIAM S. PEAVEY, OF CHICAGO, ILLINOIS, ASSIGNOR OF ONE-HALF TO WILLIAM A. KING, OF CHICAGO, ILLINOIS.

LUBRICATOR.

SPECIFICATION forming part of Letters Patent No. 742,484, dated October 27, 1903.

Application filed March 31, 1903. Serial No. 150,346. (No model.)

*To all whom it may concern:*

Be it known that I, WILLIAM S. PEAVEY, a citizen of the United States, residing at Chicago, in the county of Cook and State of Illinois, have invented certain new and useful Improvements in Lubricators, of which the following is a full, clear, and exact specification.

My invention relates to that class of lubricating devices for supplying steam-passages with lubricant to the end that the steam may carry the lubricant to the parts to be lubricated. Ordinarily with devices of this character the oil or lubricant is injected into the steam-pipe or other passage and in theory is atomized or disseminated throughout the volume of steam and floats therein to the various surfaces to be lubricated wherever the steam travels; but in practice the atomization of the lubricant has heretofore been very imperfect, making it necessary to employ a larger quantity of oil than is really necessary to lubricate the parts. This imperfection is due largely to the lack of proper means for spreading or scattering the oil and heating it to the requisite degree at the instant it is sprayed into the steam.

The primary object of my invention therefore is to spread or distribute the oil over a considerable area and retain the same a brief space of time exposed to the direct action and heat of the steam before it is atomized or sprayed, whereby it will be first reduced to a light or frothy consistency and then thoroughly scattered or disseminated throughout the entire volume or current of steam.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claim.

Figure 1:
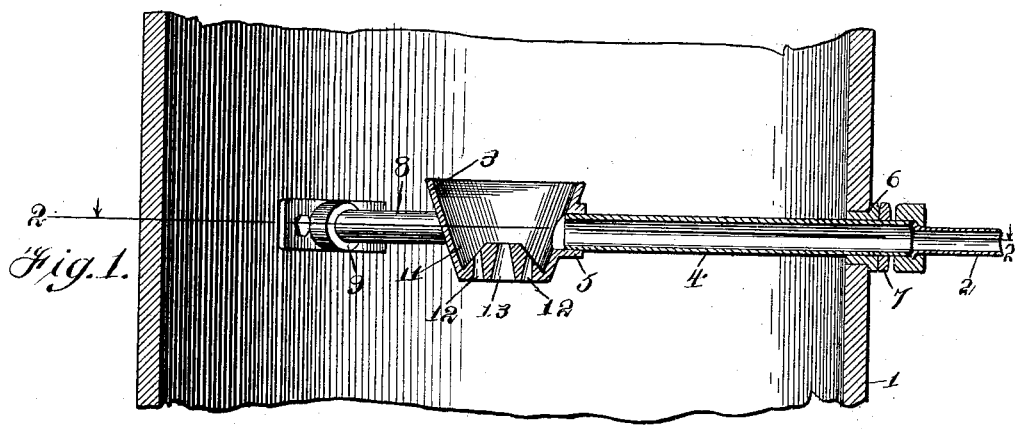
Figure 2:
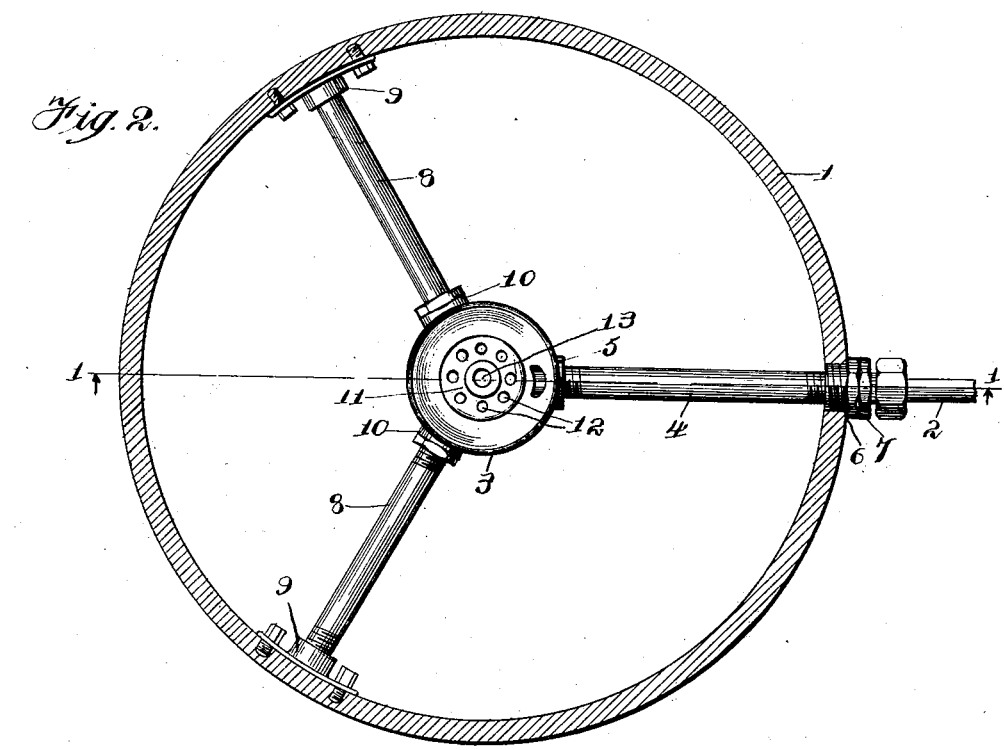

In the said drawings, Figure 1 is a vertical sectional view of my improved apparatus and the steam pipe or passage in which it is secured, taken on the line 1 1 of Fig. 2; and Fig. 2 is a plan section taken on the line 2 2 of Fig. 1.

1 is the steam-pipe or other passage which is to be supplied with lubricant in order that the steam therein may convey the lubricant to the internal parts of the valve mechanism or other parts of a steam-engine or other machine where the lubricant is desired, and 2 is the end of a pipe or passage which may be connected at its other end to any suitable source of oil or lubricant supply (not necessary to illustrate) and through which the lubricant may feed by gravity or be forced as desired. This pipe 2 is connected in any suitable way to a cup 3, arranged within the pipe or passage 1 in a horizontal position, with its concave or hollow side turned toward the steam-supply. As a means of connecting the cup to the pipe 2 I have shown a short section of pipe 4, which has one end threaded in a perforated boss 5 on the side of the cup 3 and its other end in a suitable bushing 6, secured in the side of the pipe 1 and serving, in conjunction with a jam-nut 7 on the outer end of pipe or tube 4, to hold the latter in place. In order that the cup 3 may be rigidly held against vibration by the force of the steam, it may be braced by radial rods 8, secured by plates 9 to the inner wall of pipe or passage 1 at their outer ends and threaded or otherwise secured in bosses 10 on the side of the cup at their inner ends.

The cup 3 is funnel-shaped or flaring, and the bottom thereof is formed with an annular trough or groove 11, around the inner edge of which, at a considerable distance from the bottom thereof, are formed a number of downwardly-extending perforations or channels 12, while in the center of the bottom is formed a larger perforation or channel 13, so that the effect will be to catch and compress the steam as it rushes into the cup and induce it to discharge through the perforations or channels 12 13 with great force, all of these channels being preferably of greater diameter at their lower ends than at their upper ends, so that the current from the central channel or perforation 13 will be sprayed out in all directions and intercept the currents from the smaller perforations 12, which will likewise diverge in a downward direction, and consequently the oil or lubricant which is siphoned out of the cup by the rushing steam through the perforations 12 will be thoroughly disseminated or atomized throughout the entire current or volume of steam passing through the pipe or passage 1, it being understood that the oil which feeds through the pipe or tube 4 collects in the trough 11 of the cup and is thereby retained in contact with the steam and the heat of the cup a sufficient length of time to cause it to boil or froth, giving it a very light consistency, and in bubbling over the holes or perforations 12 becomes atomized or broken up into very minute particles, forming a mist or spray which readily floats in the current of steam and searches all parts of the internal mechanism, and as a consequence with my device much better lubrication with a much smaller quantity of lubricant may be obtained.

Having thus described my invention, what I claim as new therein, and desire to secure by Letters Patent, is—

In a lubricator, the combination of a steam-pipe, or passage, to be supplied with lubricant, a cup supported therein with its open side turned toward the steam-supply and provided in its bottom with a downwardly-flaring central aperture, and a series of apertures surrounding said central aperture, and, below and contiguous to said latter apertures, a groove or channel for holding a quantity of lubricant, and means for supplying said cup with lubricant.

W. S. PEAVEY.

Witnesses:
F. A. HOPKINS,
M. B. ALLSTADT.